(12) United States Patent
Belady et al.

(10) Patent No.: US 7,730,365 B1
(45) Date of Patent: Jun. 1, 2010

(54) WORKLOAD MANAGEMENT FOR MAINTAINING REDUNDANCY OF NON-DATA COMPUTER COMPONENTS

(75) Inventors: Christian L. Belady, McKinney, TX (US); Thomas L. Vaden, Neshanic Station, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 433 days.

(21) Appl. No.: 11/742,467

(22) Filed: Apr. 30, 2007

(51) Int. Cl.
*G06F 11/00* (2006.01)

(52) U.S. Cl. .......................................... 714/47; 714/4

(58) Field of Classification Search .................. 714/47, 714/4, 1, 2, 48; 718/105
See application file for complete search history.

(56) References Cited

U.S. PATENT DOCUMENTS

| 2004/0267932 | A1 | 12/2004 | Voellm |
| 2005/0210469 | A1 | 9/2005 | Chung |
| 2005/0210470 | A1 | 9/2005 | Chung |
| 2006/0080268 | A1 | 4/2006 | Afeyan |
| 2006/0294323 | A1* | 12/2006 | Armstrong et al. ........... 711/153 |
| 2007/0011495 | A1* | 1/2007 | Armstrong et al. ............ 714/39 |
| 2007/0180280 | A1* | 8/2007 | Bolan et al. ................. 713/300 |
| 2007/0198982 | A1* | 8/2007 | Bolan et al. ................. 718/104 |
| 2007/0256076 | A1* | 11/2007 | Thompson et al. .......... 718/102 |

* cited by examiner

*Primary Examiner*—Dieu-Minh Le (57) ABSTRACT

A computer system takes redundancy into account when allocating hardware resources to workloads in the event of a failure of a non-data-handling component.

18 Claims, 5 Drawing Sheets

WORKLOAD MANAGEMENT FOR MAINTAINING REDUNDANCY OF NON-DATA COMPUTER COMPONENTS

BACKGROUND OF THE INVENTION

High-availability computing systems use redundancy to guarantee continuous operation even when a component fails. When a failure of a component is detected, a system administrator can be notified and the component replaced. However, until the failed component is replaced, the computer system is subject to an increased risk of failure due to the reduction in redundancy.

If the failed component is a data-handling component, e.g., a data processor, a data storage device, or a communication device, a workload that had been using that component can be reconfigured or migrated to use alternative hardware. If the failure is of a non-data component, e.g., a power supply or a cooling component such as a fan, 1) the system can continue to run at increased risk of interruption due to a second failure, 2) the system can be shutdown immediately, 3) components can be monitored for problems, and the system can be shutdown if problems (e.g., excessive heating) are detected, or 4) performance can be throttled to within the capability of the remaining non-data components.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Workload management software can be used to dynamically allocate hardware resources to software workloads according to management policies. These policies can strive to optimize such factors as uptime and performance by monitoring parameters such as the number of requests received, the average time it takes to handle a request, and component utilization. In addition, such policies can seek to limit power consumption and heat accumulation. In accordance with the present invention, such policies can also provide for maintaining a level of redundancy for non-data-handling computer components such as power supplies and cooling components, e.g., fans. For example, when one of plural redundant power supplies fail, processors can be throttled so that the remaining power supplies can support an additional failure without interrupting computer operation.

Figure 1:
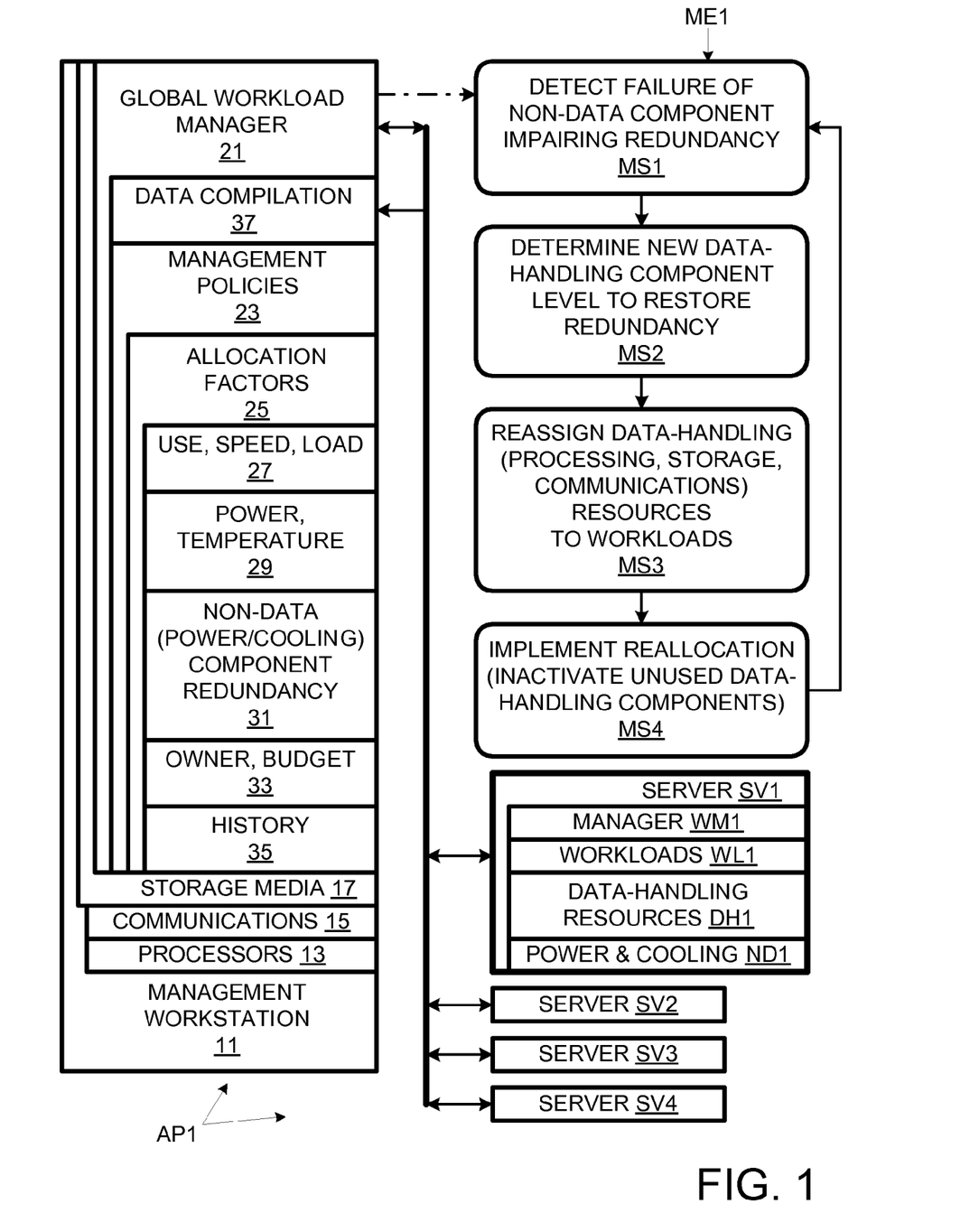
FIG. 1 is a combination schematic diagram of a system and a flow chart of a method, both in accordance with embodiments of the invention.

A computer system AP1 in accordance with an embodiment of the invention comprises four servers SV1-SV4 and a management workstation 11, as shown in FIG. 1. Server SV1 includes a local workload manager WM1, workloads WL1, data-handling hardware resources HW1 (processors, storage media, and communications devices), and non-data-handling components ND1, including power supplies and cooling devices such as fans. Workload manager program WM1 1) implements allocations determined by management workstation 11, and 2) provides data to management workstation W1 for allocation determinations. Servers SV2-SV4 are similar in principle, but can have different component counts and types with different performance and capacity specifications.

Management workstation 11 is dedicated to managing servers SV1-SV4, while servers SV1-SV4 can serve various purposes, such as web-page serving and database applications. In other embodiments, the number of servers can range from one to many, and the function of workstation 11 can be performed by one of the servers or be distributed among the servers. Management workstation 11 includes processors 13, communication devices 15, and computer-readable storage media 17. Media 17 stores computer-readable data and computer-executable instructions for manipulating the data. In particular, management workstation 11 runs workload manager 21, which plans allocations of hardware resources to workloads periodically and on occasion of an event such as a hardware failure.

Workload manager 21 allocates resources to workloads in accordance with management policies 23. Management policies 23 specify how hardware resources are to be allocated to workloads, and specify how resource assignments are to be prioritized when not all workload requirements can be met.

There are several allocation factors 25 to be considered in assigning resources to workloads. Utilization, performance, and load 27 are factors that relate to the data-handling resources themselves (utilization) and to the workloads themselves (performance and load). Power and temperature 29 are parameters that can be monitored and used in allocations, e.g., to maintain sustainable power levels, to contain energy costs, and to maintain safe operating temperatures.

Non-data component redundancy 31 also relates to power and temperature (e.g., cooling), but there is a sharp distinction drawn between redundancy and the underlying parameters. Factors 29 seek resource allocations that will be sustainable assuming all currently functional power/cooling components remain functional, while factors 31 seek resource allocations that will be sustainable even if a currently functional component fails. For example, in the event one of three power supplies fails, even if the remaining two power supplies suffice to maintain a certain processor frequency, it may be desirable to throttle that processor to ensure uninterrupted operation in the event that one of the two remaining power supplies fails. In general, one has to throttle more to restore redundancy than one would to maintain operation without restoring redundancy. However, this relationship can be altered by defining less stringent thresholds, e.g., for request response time, to be met in the event of a failure.

Factors 33 include ownership and budget. Workloads may belong to different owners, e.g., different companies or independently budgeted departments within a company. Owners can be assigned different priorities and may be limited by different budgets. Factors 35 are historical versions of some of the factors discussed above including use, performance, and load factors 27, and power and temperature 29. These can include what parameters took what values when and under what conditions. This information can also indicate what impact certain past reallocations had on these parameters.

Data compilation module 37 gathers the data used to plan reallocations from local workload managers, e.g., manager WM1 of server SV1.

System AP1 provides for a method ME1, flow charted in FIG. 1. When a failure of a non-data-handling component that impairs redundancy is detected at method segment MS1, workload manager 21 determines a new resource level that will restore redundancy given the loss of the failed component. This new resource level is then allocated to workloads at method segment MS3. The new allocation is implemented at method segment MS4. This can involve inactivating some data-handling components to meet original redundancy levels or redundancy objectives. Alternatively, the server can be throttled to restore redundancy; in this case, the server's workload can be migrated to a different serve.

Figure 2:
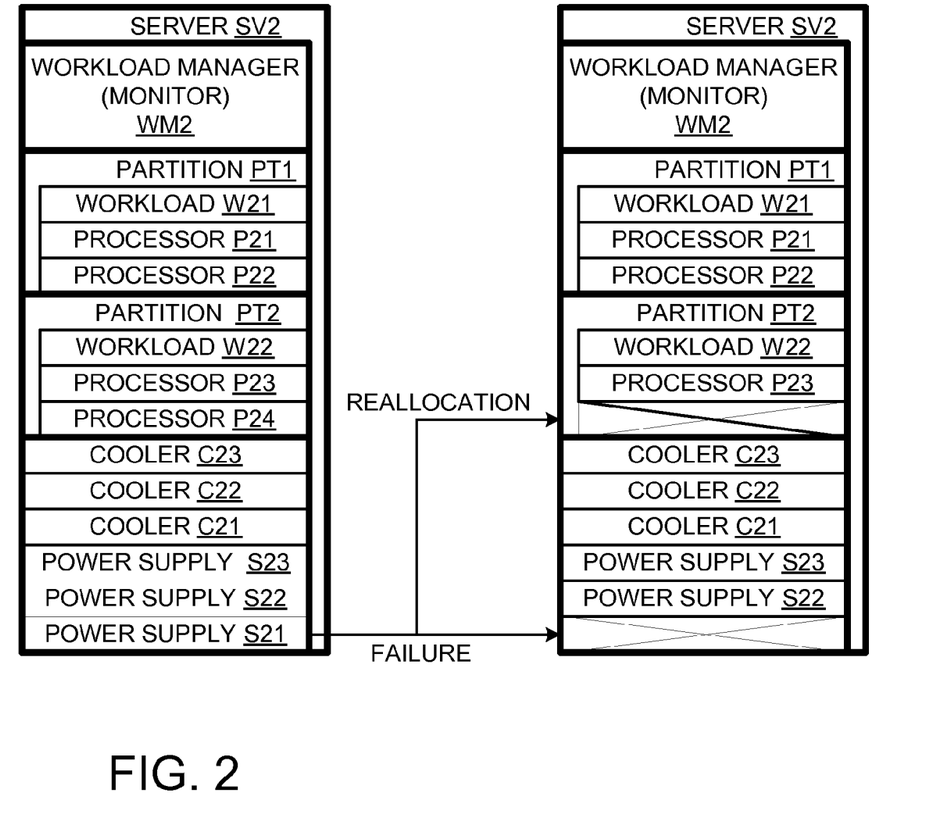
FIG. 2 is a schematic before-and-after diagram of a server of the system of FIG. 1 showing a response to a power supply failure.

FIG. 2 depicts configurations of server SV2 before and after a failure of a redundantly arranged power supply S21. The server platform runs a workload manager and monitor WM2, while the user section of server SV2 is divided into two partitions PT1 and PT2. Partition PT1 has two data processors P21 and P22 assigned to it for running workload W21; likewise, partition PT2 has two processors P23 and P24 assigned to it for running workload W22. Server SV2 has three redundantly arranged power supplies S21, S22, and S23, and three redundantly arranged fans C21, C22, and C23.

In the scenario of FIG. 2, power supply S21 fails. Workload manager WM2 continuously monitors power supplies and fans. The failure of power supply S21 is detected by a power meter, which shows the power supply output falling out of specifications. Power supplies S22 and S23 increase their outputs to make up for the loss of power supply S21 so there is no interruption of service.

Workload manager WM2 notifies workload manager 21 (FIG. 1) of this failure. Workload manager 21 determines from configuration data for server SV2 an output level that could be sustained if a further failure, e.g., of power supply S22 or S23 occurred. From this calculation, workload manager WM3 recognizes that a subsequent failure of either power supply S22 or S23 could not be fully compensated for by the other at the current demand for power. Accordingly, workload manager 21 initiates planning for a new allocation of resources to workloads subject to a limitation that a further power-supply failure will not interrupt services.

Applying management policies 23 (FIG. 1) to this new limited resource allocation determines that redundancy can be resumed if one processor is dropped. As dictated by priorities set forth by management policies 23, processor P24, assigned to workload W22, is inactivated. Workload W22 might be, for example, lower priority than workload W21 although there could be many other reasons for the chosen configuration. The original configuration of server SV2 can be restored after power supply S21 is replaced.

Note that if it is necessary to inactivate a second processor to achieve redundancy, either processor P23 or one of P21 and P22 could be selected, depending on management policies 23. If processor P23 is deactivated along with processor P24, partition PT2 is effectively terminated, and workload W22 is lost until a power supply replacement permits the original configuration to be restored. Alternatively, workload W22 could be migrated to another server.

Deactivating components is not the only way to save power. Some processors, memory modules, and communications devices provide for reduced power operational modes. These may involve reduced operating speeds, reduced bandwidth, reduced parallelism, or reduced functionality. These approaches tend to reduce the full-utilization performance of the devices; according use of these modes is referred to herein as "throttling". The present invention provides for inactivating devices, throttling devices, and combinations of the two.

Figure 3:
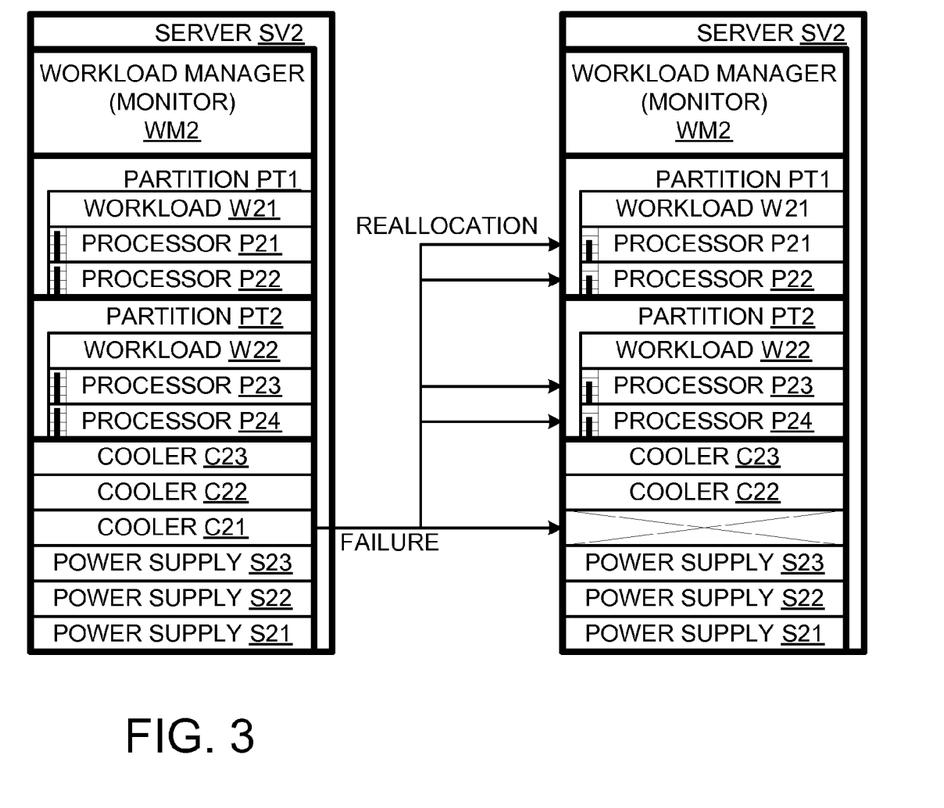
FIG. 3 is a schematic before-and-after diagram of the server of FIG. 2 showing a response to a cooling device failure.

FIG. 3 depicts a second scenario for server SV2. In this case, the failure is of a cooling fan C21, dropping the number of available fans from three to two, and the number that would remain after a subsequent failure from two to one. While the remaining two fans C22 and C23 are sufficient to cool server SV2, processors P21-P24 are throttled, as indicated by respective bar graphs in FIG. 3, to a level sustainable by one fan to re-establish redundancy. Instead of inactivating a processor, all processors are throttled back so that the total heat generated is manageable by either fan C22 or fan C23 alone.

Depending on the policies, all processors can be throttled back evenly or to different extents, e.g., to address differential priorities in the workloads. Also, the response to the failure can depend on which cooling device fails if the cooling devices have different capacities or are situated differently. If the cooling devices remaining after a failure have different cooling capabilities, the prospect that either of the two remaining fans could be next to fail must be addressed to plan a reallocation to restore redundancy.

Figure 4:
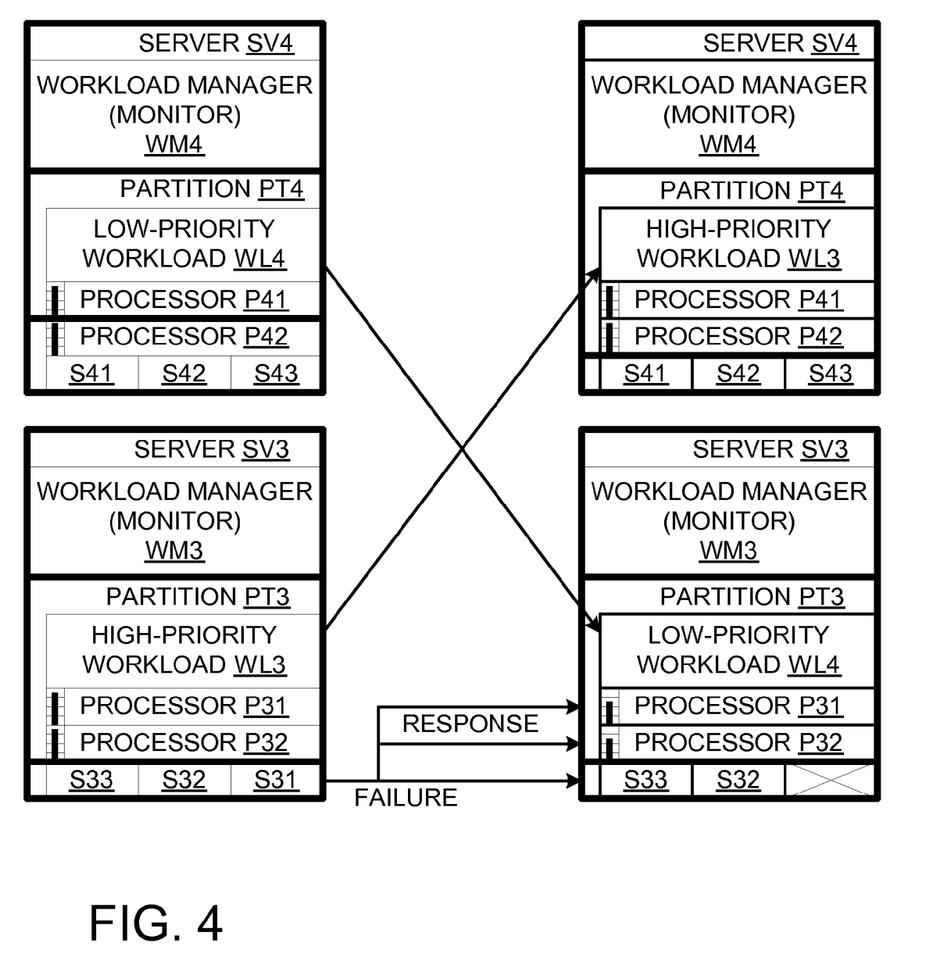
FIG. 4 is a schematic before-and-after diagram of a pair of servers of the system of FIG. 1 showing a response to a power supply failure.

FIG. 4 depicts a power-supply scenario for servers SV3 and SV4. Server SV3 includes a workload manager WM3, and a single partition PT3 with processors P31 and P32. A relatively high-priority workload WL3 runs on partition PT3. A trio of redundant power supplies S31, S32 and S33 supply server SV3 with power. Server SV4 is similar, having a workload manager WM4, a partition PT4 with two processors P41 and P42, and three power supplies S41, S42, and S43. A relatively low-priority workload WL4 funs in partition PT4. Before the failure, all processors P31-P42 are operating at a high performance level, as indicated by the respective bar graphs on the left side of the figure.

In the scenario of FIG. 4, power supply S31 fails. Remaining power supplies S32 and S33 suffice to maintain the pre-failure level of performance for processors P31 and P32; however, at this high-performance processor setting, a second power-supply failure would result in unreliable operation of server SV3. Accordingly, processors P31 and P32 are throttled as indicated by the post-failure bar graphs for processors P31 and P32. Note that processors P41 and P42 of server SV4 are unaffected by the loss of power supply S31, so their performance setting is not altered.

In the pre-failure allocation of resources to workloads, workload WL3 on server SV3 has a higher priority than workload WL4 on server SV4. Absent migration of workloads, the failure result would be that the lower performing partition PT3 would be assigned to the high priority workload. Assuming this is not optimal, workloads WL3 and WL4 can be cross-migrated so that high priority workload WL3 runs on higher performance server SV4. By implication, this requires migrating a workload, e.g., low-priority workload WL4) to hardware resources formerly served by the failed power supply. Such a migration of a workload to a server that had just suffered a failure would be counterintuitive in the prior art.

Figure 5:
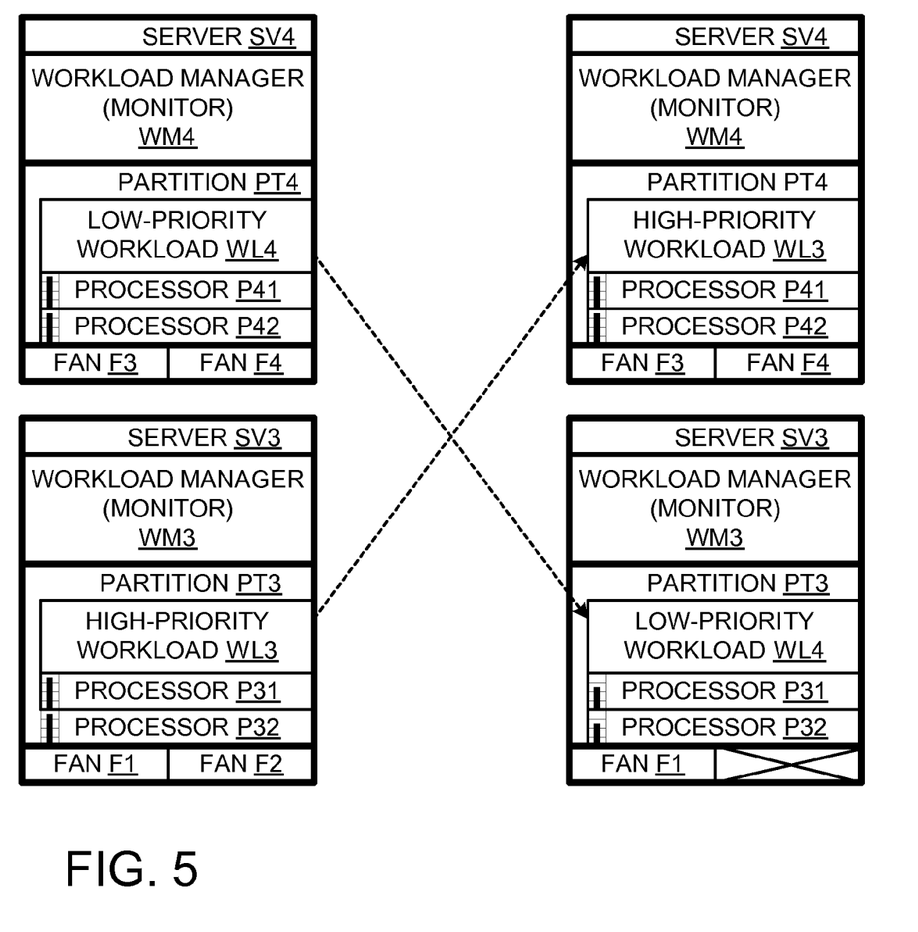
FIG. 5 is a schematic before-and-after diagram of the pair of servers of FIG. 4 showing a response to a cooling device failure.

FIG. 5 depicts a scenario in which redundancy is taken into account to plan a reallocation, but redundancy is not restored. Server SV3 has redundant fans F1 and F2, while server SV4 has redundant fans F3 and F4. In a case where fan F2 fails, fan F1 suffices to maintain the pre-failure performance of processors P31 and P32. However, should fan F1 fail while fan F2 is down, server SV3 will overheat: thus, while fan F2 is down, it is not feasible to restore redundancy for server SV3.

Shutting down server SV3 completely can restore system-wide redundancy. However, instead, workloads WL3 and WL4 are cross migrated so that the workload subject to a risk of further failure is a low priority workload WL4. In addition, processors P31 and P32 are throttled. Even though this throttling does not achieve redundancy, it can increase the time before overheating occurs, and thus give time to shut workload WL4 down safely or to migrate it to another server. Thus, while redundancy is not restored, it is taken into account in the reallocation of resources.

"Redundancy" is a property that allows an incorporating system to continue functioning in the event of a failure of a redundant component. Redundancy can be provided in a variety of ways, for example: 1) a component can remain dormant but available as a backup; or 2) multiple (n) components, which can be similar or dissimilar, can be used in parallel where n−1 components have sufficient capacity.

A "computer" is a machine that manipulates data in accordance with instructions. "Computer system" herein encompasses systems of various scales, from individual servers to full data centers. In the latter case, the invention can apply to power distribution unit (PDU) as well as a power supply or to computer room air conditioner (CRAC) as well as a fan. In these cases, the unit of reallocation would be server instead of processor component?

A "program" is an ordered series of computer-executable instruction. As used herein, a "program" is inherently tangibly embodied in computer-readable media. A "server" is a computer that provides services, e.g., serves web pages to or responds to database queries from, other computers.

"Computer-readable media" refers to media that can be accessed by a computer and includes volatile and nonvolatile, removable and non-removable media. By way of example, and not limitation, computer-readable media may comprise computer storage media and communication media.

"Computer storage media" includes volatile and nonvolatile, removable and non-removable media implemented in any method or technology for storage of information such as computer-readable instructions, data structures, program modules or other data.

"Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

"Performance" refers herein to the rate that work gets done. "Throttling" refers to setting a parameter of a hardware device so that the full-utilization performance is reduced. Techniques for throttling processors, memory, and communication devices are known. At low utilizations, throttling does not necessary impact performance, but it does impact full-utilization performance, i.e., the rate at which work gets or would get done when utilization is 100%.

The present invention provides for a variety of computer system configurations, including single standalone computer systems and computers with multiple standalone systems. Systems within one or more workloads are provided for. Management policies may require shutdown of a server if necessary to achieve redundancy, or may simply require allocations to take into account levels of redundancy. These and other variations upon and modifications to the illustrated embodiments are provided for by the present invention, the scope of which is defined by the following claims.

What is claimed is:

1. A computer system comprising:
   data and non-data handling hardware resources, said non-data-handling resources being configured redundantly so that if one fails a workload running on said hardware resources is not interrupted; and
   a workload manager for allocating said data hardware resources to workloads in part as a function of at least one of utilization of at least some of said data-handling hardware resources, workload performance, and workload load, and in part as a function of a redundancy level for said non-data handling resources.

2. A computer system as recited in claim 1 wherein; said workload manager, in the event of a failure of a non-data-handling component impairing redundancy so as to impact reliability, reallocates said hardware resources so as to reduce full-utilization performance and to restore redundancy.

3. A computer system as recited in claim 2 wherein said performance is reduced by inactivating some of said hardware resources.

4. A computer system as recited in claim 2 wherein said performance is reduced at least in part by reducing the performance level of at least some of said hardware resources.

5. A computer system as recited in claim 1 wherein said workload manager, in the event of a failure of a non-data-handling component that impairs the reliability of a first set of said hardware resources but not of a second set of said hardware resources, migrates a first workload from said second set to said first set.

6. A computer system as recited in claim 5 wherein said workload manager, in the event of said failure, migrates a second workload from said first set to said second set.

7. A computer system as recited in claim 1 wherein said data-handling components include at least one of processors, storage devices, and communications devices, and wherein said non-data-handling components include at least one of cooling devices and power supplies.

8. A method comprising:
   detecting failure of one of plural redundant non-data-handling computer components, said failure resulting in a decrease in the redundancy level of said non-data-handling components;
   reducing the overall performance of data-handling computer components formerly serviced by said redundant non-data-handling computer components so as to increase said redundancy level; and
   migrating a first workload to said data-handling computer components formerly serviced by said redundant non-data-handling computer components from data-handling computer components not formerly serviced by said redundant non-data-handling computer components.

9. A method as recited in claim 8 wherein said migrating is performed before said reducing.

10. A method as recited in claim 8 further comprising migrating a second workload from said data-handling computer components formerly serviced by said redundant non-data-handling computer components to data-handling computer components not formerly serviced by said redundant non-data-handling computer components.

11. A method as recited in claim 8 wherein said reducing involves inactivating at least one data-handling computer component.

12. A method as recited in claim 8 wherein said reducing involves reducing the clock rate of at least one processor.

13. Computer-readable storage media comprising:
computer-executable software encoded therein, said software including
 a data compiler for receiving data indicating that one of plural redundant non-data-handling computer components has failed so as to decrease an associated redundancy level without reducing performance of a workload running on data-handling resources serviced by said non-data-handling computer components;
 management policies for indicating how to reallocate hardware resources in response to such a failed one of said plural redundant non-data-handling computer components, said management policies indicating plural factors for planning how to reallocate, said factors including at least one of utilization of said hardware resources, performance of a workload running on said hardware resources, and load on a said workload, said plural factors further including redundancy level of said non-data-handling computer components; and
 a workload manager for implementing said reallocation.

14. Computer-readable storage media as recited in claim 13 wherein said policies provide for reducing a performance level of hardware resources serviced by said non-data-handling components to increase said redundancy level.

15. Computer-readable storage media as recited in claim 13 wherein said policies provide for inactivating data-handling resources to increase said redundancy level.

16. Computer-readable storage media as recited in claim 13 wherein said management policies provide for migrating a workload from data-handling resources serviced by said redundant non-data-handling components to other data handling resources not serviced by said non-data-handling components.

17. Computer-readable storage media as recited in claim 13 wherein said management policies provide for migrating a workload to data-handling resources serviced by said redundant non-data-handling components from other data-handling resources not serviced by said non-data-handling components.

18. Computer-readable storage media as recited in claim 13 wherein said non-data-handling components include at least one of power supplies and cooling components and said data-handling resources include at least one of processors, data storage devices, and communications devices.

* * * * *

UNITED STATES PATENT AND TRADEMARK OFFICE
CERTIFICATE OF CORRECTION

PATENT NO. : 7,730,365 B1
APPLICATION NO. : 11/742467
DATED : June 1, 2010
INVENTOR(S) : Christian L. Belady et al.

Page 1 of 1

It is certified that error appears in the above-identified patent and that said Letters Patent is hereby corrected as shown below:

In column 6, line 25, in Claim 2, delete "wherein;" and insert -- wherein --, therefor.

Signed and Sealed this
Twenty-eighth Day of December, 2010

David J. Kappos
*Director of the United States Patent and Trademark Office*